United States Patent [19]

Leclerc

[11] 4,140,187
[45] Feb. 20, 1979

[54] HARROW SUPPORT

[76] Inventor: Enard Leclerc, 9, St-Francois East, Cap Sante, Co. of Portneuf, Quebec, Canada

[21] Appl. No.: 806,452

[22] Filed: Jun. 14, 1977

Related U.S. Application Data

[63] Continuation-in-part of Ser. No. 697,375, Jun. 18, 1976, abandoned.

[30] Foreign Application Priority Data

Feb. 13, 1976 [CA] Canada .................................. 245736

[51] Int. Cl.² .......................................... A01B 21/06
[52] U.S. Cl. .................................................. 172/524
[58] Field of Search ............... 172/524, 523, 522, 525, 172/47, 169, 110, 449, 439, 111

[56] References Cited

U.S. PATENT DOCUMENTS

| | | | |
|---|---|---|---|
| 818,307 | 4/1906 | Smith | 172/524 |
| 1,134,639 | 4/1915 | Richard | 172/524 |
| 1,683,768 | 9/1928 | Etheredge | 172/526 |
| 2,560,909 | 7/1951 | Thompson | 172/523 |
| 2,700,925 | 2/1955 | Miller | 172/523 |
| 2,919,143 | 12/1959 | Garner | 172/449 X |
| 2,951,547 | 9/1960 | Lawrence | 172/523 |

FOREIGN PATENT DOCUMENTS

1347028 11/1963 France .................................... 172/524

Primary Examiner—Richard J. Johnson
Attorney, Agent, or Firm—Raymond A. Robic; Francis B. Francois; Arthur Schwartz

[57] ABSTRACT

Support means for use in connecting a circular harrow to a tractor. The support means allow the harrow to pivot about two perpendicular, generally horizontal, axes thus permitting the harrow to more closely follow the contour of the ground being harrowed.

23 Claims, 6 Drawing Figures

HARROW SUPPORT

This is a continuation-in-part of application Ser. No. 697,375, filed June 18, 1976, now abandoned.

This invention is directed to support means for use in connecting harrows, particularly circular harrows, to farm tractors.

Circular harrows are well known as shown by U.S. Pat. Nos. 229,267; 818,307 and 1,134,639 by way of example. These harrows are quite simple in construction and use, and quite sturdy. The harrows are not too popular now, however. One reason is that no satisfactory means has been provided to connect them to a tractor. More particularly, no satisfactory means for connecting the harrow to the tractor are known which allow the harrow to generally follow the contour of uneven ground.

It is therefore a purpose of the present invention to provide support means for connecting a circular harrow to a tractor which permits the harrow to pivot in two directions, to allow it to generally follow the contour of the ground being harrowed.

It is another purpose of the present invention to provide support means by means of which the harrow can be raised to a non-operating position, or lowered to an operating position, relative to the tractor.

It is another purpose of the present invention to provide a support means for a circular harrow which is simple in construction, reliable in use, and sturdy.

The invention is more particularly directed toward a support means for use in connecting a circular harrow to a tractor, which support means has means for connecting it to the center of the harrow, and first pivot means permitting a connected harrow to pivot about a first, generally horizontal axis extending radially from the center of the harrow toward the center of the tractor. The support means also has second pivot means, which permits the connected harrow to pivot about a second, generally horizontal axis which is generally transverse to the first axis.

Preferably, the second axis is spaced a distance from the connecting means greater than the radius of the harrow.

The support means comprises a support frame, a support bar and a carrying frame.

According to one aspect of the invention, the harrow is rotatably connected to the support frame by the connecting means, the support bar is pivotally connected to the support frame at one end of the support frame, and the carrying frame is connected at the same one end of the support frame. The carrying frame and the support bar are furthermore pivotally connected to the tractor.

In this first aspect, the support frame is preferably generally triangular in shape, and has a pair of angled main struts joined directly together at the peak end of the support frame and joined together at their other ends by a cross-strut.

The connecting means for connecting the support frame to the harrow may comprise a plate extending between the main struts intermediate the peak end and cross-strut, and an axle may extend down from the plate, this axle being rotatably mounted in the hub of the harrow, and about which the harrow rotates.

Preferably, the support bar is mounted adjacent the cross-strut and is pivotally connected thereto by the first pivot means in the form of a bolt, the bolt connecting the middle of the support bar in the middle of the cross-strut, the axis of the bolt generally laying on a radial line emanating from the center of the axle toward the center of the tractor, this axis constituting said first axis.

In this first aspect, the carrying frame comprises a pair of braces, each brace being pivotally connected about the second pivot means to a movement limiting guide plate, the guide plates being fixed to the main struts at the other ends thereof, each of the guide plates laying in a vertical plane generally parallel to the first axis, and having a slot through which the ends of the support bar project, these slots being substantially longer than the height of the support bar. These slots limit the amount that the support frame and the harrow can pivot about the first axis, the axis of the second pivot means constituting the second axis above mentioned.

Preferably, the braces of the carrying frame are connected together at their free top ends by a U-shaped bracket, a chain being connected between the U-shaped bracket and the plate extending between the main struts, this chain carrying the load of the harrow when the harrow is raised above the ground.

According to a second aspect, the support frame comprises two coaxial cylindrical bars, one of the bars being smaller in diameter than the other bar, and having an end pivotally inserted into an end of the other bar, the one bar with the smaller diameter being provided with a pin which cooperates with a slot provided in the other bar. The coaxial bars have an axis generally laying on a radial line emanating from the center of the harrow toward the center of the tractor, this axis constituting the first axis. The pin and slot arrangement limits the amount that the support frame and the harrow can pivot about the first axis.

In this second aspect, the other cylindrical bar is rigidly connected at its free end to the support bar and the carrying frame comprise a pair of braces, each brace being pivotally connected about the second pivot means to a movement limiting guide plate, each guide plate being rigidly connected to an end of the support bar, and laying in a vertical plane generally parallel to the first axis. The axis of the second pivot means constitutes the second axis above mentioned.

In this second aspect, the connecting means for connecting the support frame to the harrow comprises a plate rigidly connected to the free end of the one cylindrical bar, and an axle extending down from the plate, this axle being rotatably mounted in the hub of the harrow, and about which the harrow rotates.

In a third aspect of the invention, the support frame comprises a single cylindrical bar having a plate rigidly connected to one end thereof, the plate having a downwardly extending axle on which the hub of the harrow is mounted. The other end of the cylindrical bar is pivotally connected to the support bar, and means is provided to limit pivoting movement of the cylindrical bar about its axis.

Embodiments of the invention will now be described in an exemplary and a non-limitative manner, having reference to the accompanying drawings, in which.

Figure 1:
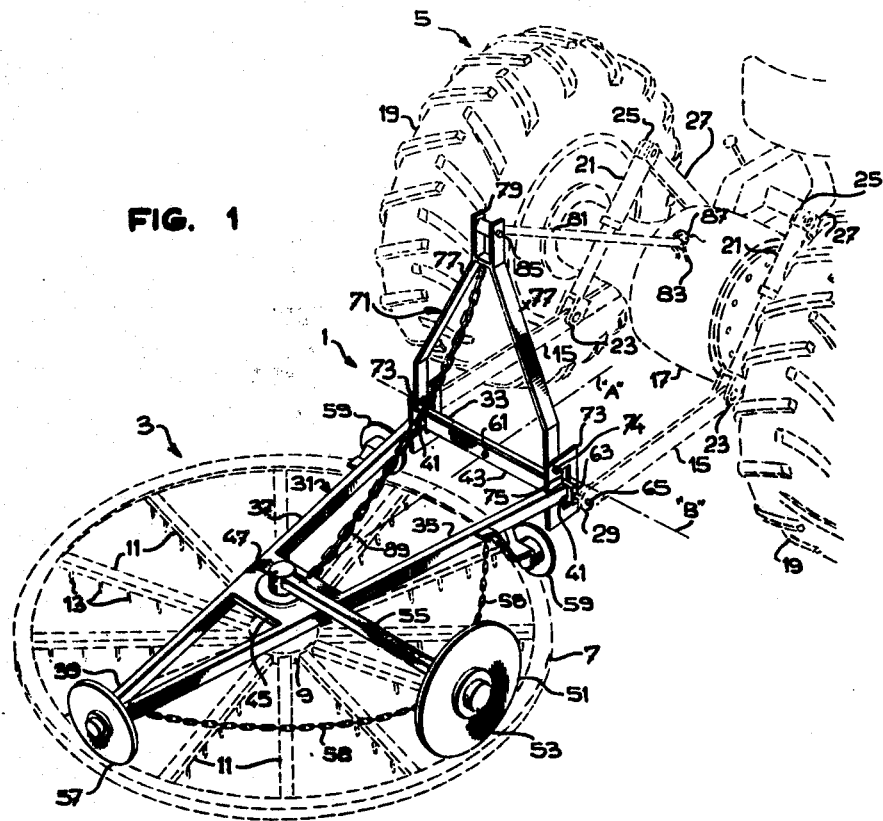
FIG. 1 is a perspective view of a first embodiment according to the invention, showing the support means connecting the circular harrow to the tractor.

Referring now to the drawings, the support means 1 is used to connect a circular harrow 3, in an advantageous manner, to a tractor 5 which will pull the harrow.

The circular harrow 3 is of the type having a circular rim 7, a central hub 9, and spokes 11 radiating out from the hub 9 to the rim 7. Each spoke 11 has a series of harrow teeth 13 extending down from the spoke. Harrows of this type are well known.

The tractor 5 has a pair of implement supports 15 extending rearwardly therefrom. These supports 15 are located to extend from beneath the axle 17 and adjacent each wheel 19. Hydraulic means 21 are provided, attached at one end 23 to the supports 15 intermediate their ends, and at the other end 25 to the tractor frame 27. The hydraulic means 21 raise or lower the supports 15.

Figure 2:
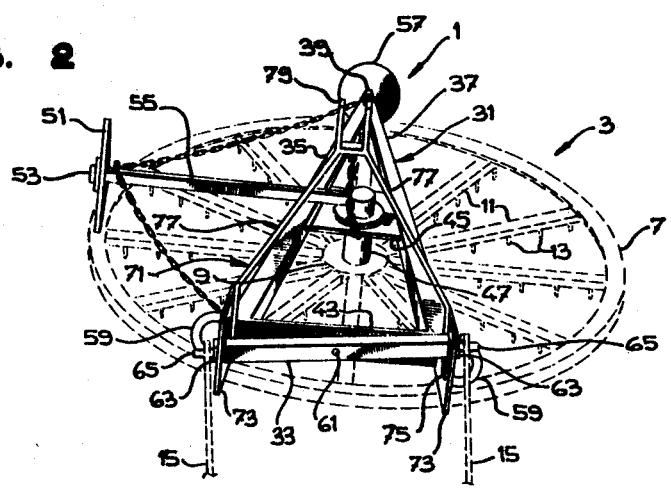
FIG. 2 is a perspective view of the support means and the harrow, as viewed from the tractor.
Figure 3:
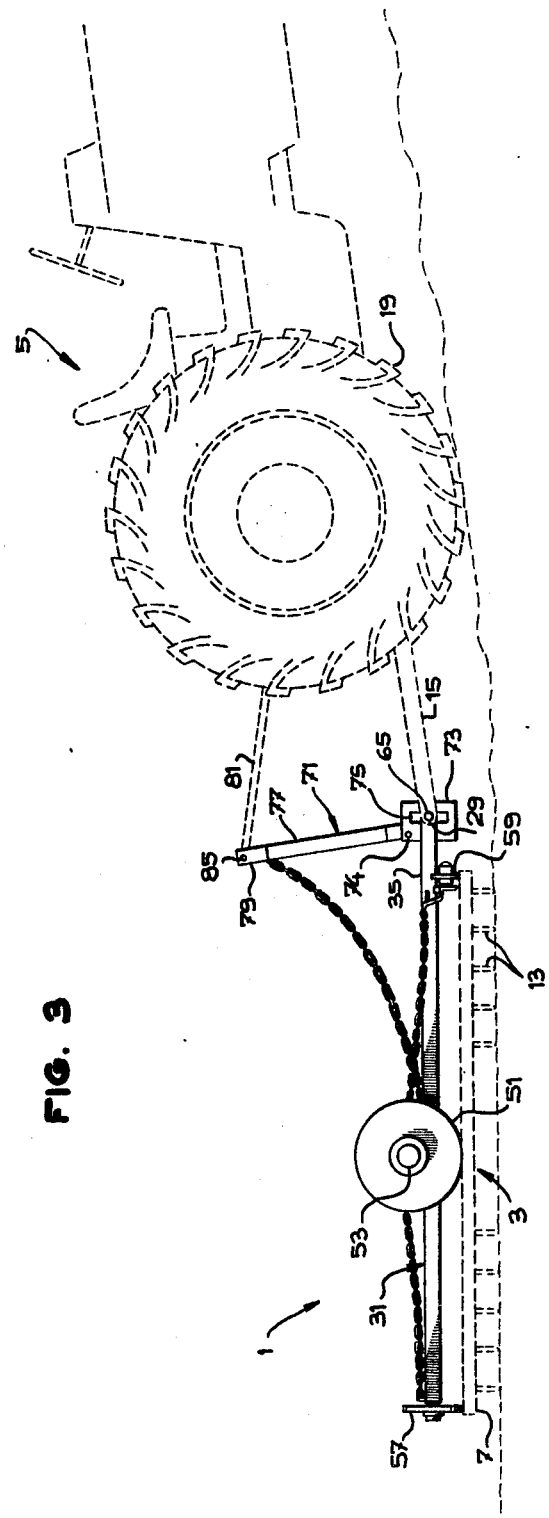
FIG. 3 is an elevational view of the support means.

The support means 1 is connected to the harrow 3, at its hub 9, and to the ends 29 of the implement supports 15 of the tractor 5 which ends 29 are located near the rim 7 of the harrow. The support means 1 comprises a support frame 31, a support bar 33 and a carrying frame 71. In the embodiment of FIGS. 1 to 3, the support frame 31 is triangular in shape and has a pair of angled main struts 35, 37 joined directly together at the peak end 39 of the support frame and joined together at their other end 41 by a cross-strut 43. A plate 45 extends between main struts 35, 37 intermediate peak end 39 and cross-strut 43. An axle 47, extending down from plate 45, is rotatably mounted in hub 9 of harrow 3 and the harrow rotates about this vertical axle.

A heavy wheel 51, rotatably mounted by an axle 53 to a radial arm 55, connected in turn to plate 45, rides on rim 7. The arm 55 extends transversely from frame 31 and thus generally transversely from the direction the harrow 3 is pulled. The wheel 51 pushes the harrow down underneath it, causing this one side of the harrow to dig in more than the other side, and thereby causing the harrow to rotate about axle 47, as is known. A guide wheel 57 (FIGS. 1 to 3) is rotatably mounted at peak end 39 of frame 31, and a pair of guide wheels 59 (FIGS. 1 to 3) is also rotatably mounted on struts 35, 37 near their ends 41. The guide wheels 57, 59 also ride on rim 7 to provide stability for the harrow. Chains 58 limit the rotating movement of wheel 51.

The support bar 33 has a quadrangular cross-section, is mounted adjacent cross-strut 43, and is pivotally connected thereto by a pivot pin in the form of a bolt 61. Bolt 61 connects the middle of the support bar 33 to the middle of strut 43 and the axis of bolt 61 generally lies on a radial line emanating from the center of axle 47 toward the center of the tractor. Frame 31 is thus pivotable about a horizontal first axis "A" extending radially from axle 47 to the center of the tractor.

The carrying frame 71 comprises a pair of braces 77 and a pair of movement limiting guide plates 73 fixed to the main struts 35, 37 at their ends 41. The plates 73 lie in a vertical plane parallel to axis "A". Each plate 73 has a vertical, rectangular slot 75 through which the ends 63 of support bar 33 project. The slots 75 are substantially longer than the height of bar 33.

The braces 77 are pivotally connected respectively around pivots 74 to each plate 73. The braces 77 extend up, and toward one another. They are connected together at their top ends by a U-shaped bracket 79. A connecting rod 81 extends from bracket 79 to a bracket 83 on the back of the tractor. The rod 81 is connected to bracket 79 by a bolt 85, and to bracket 83 by a ball joint 87. The implement supports 15 and the rod 81 thus cooperate with each other, and form what is commonly known as a three-point hitch arrangement.

Due to the fact that the carrying frame 71 is pivotally connected to plates 73 around pivots 74, the support frame 31 and support bar 33 connected thereto by bolt 61 are pivotable about a second axis "B" which is horizontal and which extends transversely to first axis "A". The harrow thus has two-way freedom of movement when being pulled across uneven ground.

The ends 63 of support bar 33 each have a pivot pin 65 projecting therefrom. Each pin is rotatably mounted to the end of the implement support 15. When it is desired to lift harrow 3 for easier transport by the tractor when not harrowing, the hydraulic means 21 are actuated raising supports 15. When supports 15 are raised, so is support bar 33 and attached support frame 31. Support bar and therefore attached support frame 31 pivot to a certain degree about pivots 65 until chain 89 connected between bracket 79 and plate 45 is tensioned to carry the entire load of harrow 3 which is raised above the ground.

It should also be noted that slots 75 in plates 73 limit the amount that frame 31 and harrow 3 can pivot about axis "A". However, the amount of pivoting movement permitted is suitable for most purposes.

Figure 4:
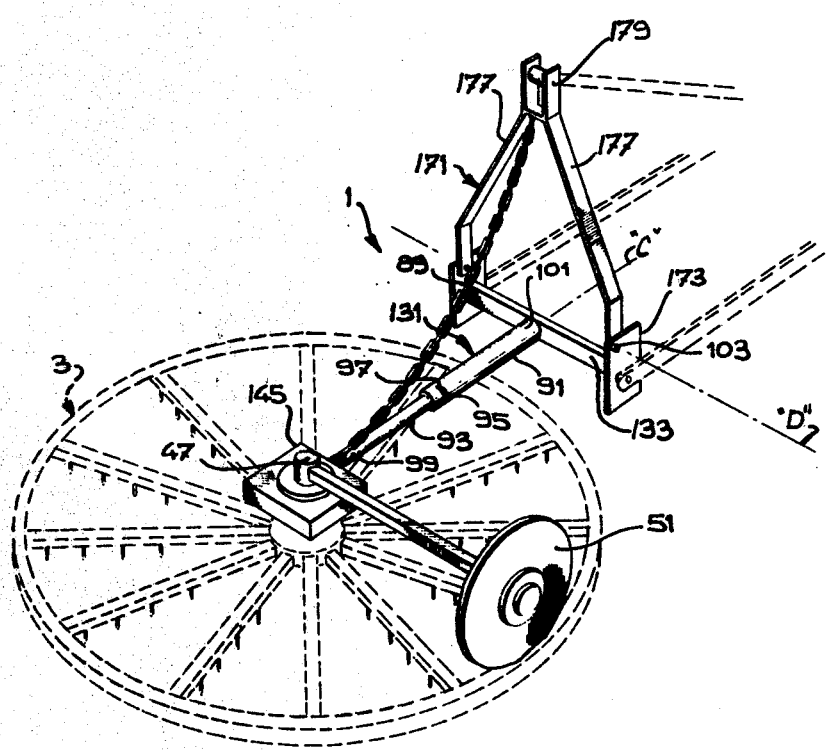
FIG. 4 is a perspective view of a second embodiment according to the invention.

In the second embodiment, shown in FIG. 4, the support means 1 comprises a support bar 133, a support frame 131, and a carrying frame 171. However, in this case the support frame 131 consists of two coaxial cylindrical bars 91 and 93, bar 93 being smaller in diameter than bar 91 and being pivotally inserted in bar 91. A pin 95 provided at the end of the bar 93 cooperates with a slot 97 at the end of bar 91, into which bar 93 is inserted. The pin and slot arrangement permits a desirable degree of relative pivoting of bars 91 and 93. The free end 99 of bar 93 is rigidly connected to a plate 145, wherefrom the axle 47 of the harrow 3 extends down, and the free end 101 of bar 95 is rigidly connected to support bar 133. Thus, in this second embodiment also harrow 3 is pivotable about a horizontal first axis "C" extending radially from axle 47 to the center of the tractor, as above explained for the embodiment of FIGS. 1 to 3.

In this second embodiment, guide plates 173 are not provided with rectangular slots 75 as in the first embodiment, and support bar 133 is rigidly connected at each end thereof to one of the plates 173.

As in the first embodiment shown in FIGS. 1 to 3, the carrying frame 171 is pivotally connected, via braces 177, to the plates 173 by means of pivots 103. Thus, as in the first embodiment, the assembly formed by plates 173, support bar 133, bars 91 and 93 and the harrow 3 pivots about a second axis "D" which is horizontal, and which extends generally transversely to the first axis "C". The two-way freedom of movement if therefore respected in this second embodiment.

Figure 6:
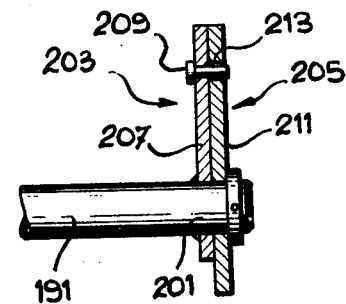
FIG. 6 is a cross-sectional view, taken on the line VI—VI of FIG. 5.
Figure 5:
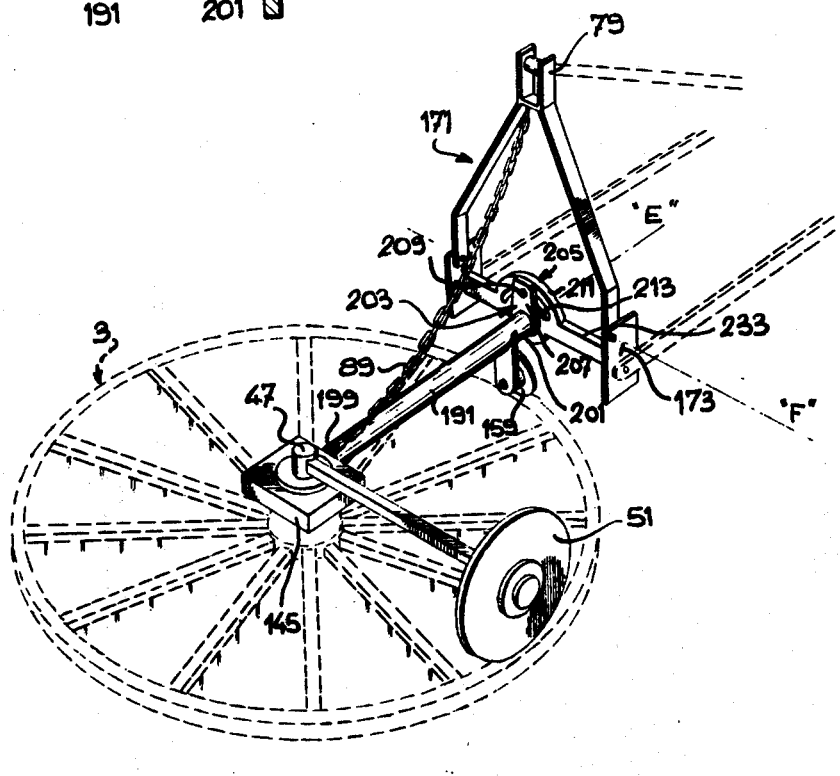
FIG. 5 is a perspective view of a third embodiment according to the invention.

In a third embodiment, as shown in FIGS. 5 and 6, instead of having two bars 91 and 93, one of them, bar 93, being pivotally inserted in the other bar 91, there is provided a single cylindrical bar 191 rigidly connected at one of its ends 199 to plate 145, wherefrom the axle 47 of the harrow 3 extends down. The other end 201 of the cylindrical bar 191 is pivotally connected to support bar 233, and is provided with first means 203 adapted to cooperate with second means 205 provided on the support bar 233 for permitting the limited pivoting movement of the bar 191 relative to support bar 233 about a horizontal first axis "E" extending radially from axle 47 to the center of the tractor 5.

The means 203 at the end 201 of bar 191 comprises a plate 207 rigidly connected to the end 201 of bar 191, and is provided with a movement limiting pin 209.

The means 205 on the support bar 233 comprises a semicircular plate 211, provided with a semicircular slot 213 adapted to receive the movement limiting pin 209.

As above explained, end 201 of bar 191 is pivotally connected to support bar 233, and in operation, due to the presence of means 203 pivotable with respect to means 205, the harrow 3 is assured of a pivoting movement around horizontal axis "E". Pin 209 received within the slot 213 of predetermined arc length limits the pivoting movement of harrow 3 about axis "E" to a desired degree. Of course, as in the embodiments of FIGS. 1 to 3 or FIG. 4, harrow 3 is also provided with a pivoting movement around a second axis "F", which is horizontal and which extends transversely to the first axis "E". This part in the embodiment of FIGS. 5 and 6 remains the same as the embodiment of FIG. 4.

A guide wheel 159 may be arranged near the end 201 of bar 191, to provide for the stability of harrow 3.

I claim:

1. Support means for use in connecting a circular harrow to a tractor, said tractor having three-point hitch implement mounting means on the rear end thereof, and said support means including:
    a support bar attachable to said three-point hitch implement mounting means to lie in a generally horizontal plane extending transversely of the longitudinal axis of the tractor;
    support frame means carried by said support bar, and extending rearwardly therefrom;
    means carried by said support frame means connecting it to the center of the harrow;
    carrying frame means attachable to said three-point hitch implement mounting means, and connected with said support bar and said support frame means;
    said support bar and said support frame means carried thereby incorporating first pivot means, arranged to permit said connected harrow to pivot relative to said support bar about a first, generally horizontal axis fixed with respect to the support bar and extending generally radially from the center of the harrow toward the center of the tractor; and
    second pivot means disposed between said carrying frame means and said support bar and the support frame means carried thereby, and arranged to permit said connected harrow to pivot about a second, generally horizontal axis fixed with respect to said carrying frame means, and extending generally transversely to said first axis.

2. Support means according to claim 1, wherein said second axis is spaced a distance, from the connecting means connecting the support frame means to the harrow, greater than the radius of the harrow.

3. Support means according to claim 1, wherein said carrying frame means includes a carrying frame having upper and lower ends, the upper end of said carrying frame being attachable to said three-point hitch implement mounting means, and the lower end thereof being connected with said support bar and the support frame means carried thereby.

4. Support means according to claim 3, wherein said harrow is rotatably connected to said support frame means by said connecting means, said support bar is pivotally connected to said support frame means at the forward end thereof, and said carrying frame is pivotally connected at its lower end with said forward end of said support frame means, said carrying frame and said support bar being furthermore pivotally attachable to said three-point hitch implement mounting means.

5. Support means as claimed in claim 4, wherein the first pivot means comprises a pivot pin pivotably joining the support frame means at its forward end to the center of the support bar.

6. Support means as claimed in claim 5, wherein the support frame means includes pivotable guide means attached to the forward end thereof, for receiving the opposite end portions of said support bar.

7. Support means as claimed in claim 1, wherein said support frame means includes a support frame, said support frame comprising cylindrical bar means connected at the outer end of one end portion thereof with said support bar and extending along said first axis, the other end portion of said cylindrical bar means having said connecting means on the outer end thereof for connecting said harrow to said support means, and at least said other end portion of said cylindrical bar means being pivotable about said first axis and relative to said support bar.

8. Support means as claimed in claim 7, including additionally: means arranged to limit the pivoting of said other end portion of said cylindrical bar means to within a prescribed arc length.

9. Support means according to claim 7, wherein said cylindrical bar means comprises two coaxial cylindrical bars, one of said bars being smaller in diameter than the other bar and having an end pivotally inserted into an end of said other bar, said one bar with the smaller diameter being provided with a pin which cooperates with a slot provided in said other bar, said coaxial bars having an axis generally laying on a radial line emanating from the center of said harrow toward the center of the tractor, said axis constituting said first axis, said pin and slot arrangement limiting the amount that said support frame and said harrow can pivot about said first axis.

10. Support means according to claim 9, wherein said other cylindrical bar is rigidly connected at its free end to said support bar.

11. Support means according to claim 10, wherein said carrying frame comprises a pair of braces, the lower end of each brace being pivotally connected about said second pivot means to a guide plate, each guide plate being rigidly connected to an end of said support bar, each of said guide plates laying in a vertical plane generally parallel to said first axis, the axis of said second pivot means constituting said second axis.

12. Support means according to claim 11, wherein said connecting means for connecting said support frame to said harrow comprises a plate rigidly connected to the free end of said one cylindrical bar, and an axle extending down from said plate, said axle being rotatably mounted in the hub of said harrow, the harrow rotating about said axle.

13. Support means according to claim 12, wherein said braces are connected together at their free top ends by a U-shaped bracket, a chain being connected between said bracket and said plate for carrying the load of said harrow when the harrow is raised above the ground.

14. Support means as claimed in claim 7, wherein said cylindrical bar means is made of one piece, and the full length thereof is pivotable about said first axis.

15. Support means as claimed in claim 7, wherein said cylindrical bar means comprises a one piece cylindrical bar pivotally connected at one end thereof with said support bar and extending along said first axis, the other end of said cylindrical bar having said connecting means rigidly connected thereto for connecting said harrow to said support means, said cylindrical bar being pivotable about said first axis and relative to said support bar, and being provided with first means adapted to cooperate with second means provided on said support bar for limiting such pivoting of said cylindrical bar relative to said support bar to within a prescribed arc length.

16. Support means as claimed in claim 15, wherein said first means for limiting pivoting comprises a plate rigidly connected at said one end of the cylindrical bar, said plate being provided with a movement limiting pin, and wherein said second means for limiting pivoting comprises a semicircular plate carried on said support bar and provided with a semicircular slot adapted to receive said movement limiting pin.

17. Support means as recited in claim 16, further comprising a guide wheel for providing the stability of said harrow.

18. Support means for use in connecting a circular harrow to a tractor, and comprising: a support frame, a support bar, and a carrying frame, said support frame being generally triangular in shape and having a pair of angled main struts joined directly together at the peak end of the support frame and joined together at their other ends by a cross-strut, said harrow being rotatably connected at the center thereof to said support frame by connecting means, said support bar being pivotally connected to said support frame at one end of said support frame, and said carrying frame being connected at said one end of said support frame, said carrying frame and said support bar being pivotally connected to said tractor; first pivot means on the support means permitting a connected harrow to pivot about a first, generally horizontal axis extending generally radially from the center of the harrow toward the center of the tractor; and second pivot means on the support means, said second pivot means permitting the connected harrow to pivot about a second, generally horizontal axis extending generally transversely to the first axis, said second axis being spaced a distance from the connecting means connecting the support means to the harrow, greater than the radius of the harrow.

19. Support means according to claim 18, wherein said connecting means for connecting said support frame to said harrow comprises a plate extending between said main struts intermediate said peak end and cross-strut, and an axle extending down from said plate, said axle being rotatably mounted in the hub of said harrow, the harrow rotating about said axle.

20. Support means according to claim 19, wherein said support bar is mounted adjacent said cross-strut and is pivotally connected thereto by said first pivot means in the form of a bolt, said bolt connecting the middle of said support bar in the middle of said cross-strut, the axis of said bolt generally laying on a radial line emanating from the center of said axle toward the center of the tractor, said axis constituting said first axis.

21. Support means according to claim 20, wherein said carrying frame comprises a pair of braces, each brace being pivotally connected about said second pivot means to a movement limiting guide plate, said guide plates being fixed to said main struts at said other ends, each of said guide plates laying in a vertical plane generally parallel to said first axis, each of said guide plates having a slot through which the ends of said support bar project, said slots being substantially longer than the height of said support bar, said slots limiting the amount that said support frame and said harrow can pivot about said first axis, the axis of said second pivot means constituting said second axis.

22. Support means according to claim 21, wherein said braces are connected together at their free top ends by a U-shaped bracket, a chain being connected between said U-shaped bracket and said plate extending between said main struts, said chain carying the load of said harrow when the harrow is raised above the ground.

23. Support means for use in connecting a circular harrow to a tractor, comprising a support frame, a separate support bar, and a carrying frame having upper and lower ends; connecting means carried by said support frame for use in connecting said support frame to the center of said harrow; first pivot means on the support means permitting a connected harrow to pivot about a first, generally horizontal axis extending generally radially from the center of the harrow toward the center of the tractor, said first pivot means comprising a pivot pin pivotably joining said support frame at its forward end to the center of said support bar; and second pivot means on the support means, said second pivot means permitting the connected harrow to pivot about a second, generally horizontal axis extending generally transversely to said first axis, said second pivot means being carried by said carrying frame for use in connecting the support means to the tractor, said carrying frame being connected to the forward end of said support frame and extending upwardly therefrom for use in lifting the support frame and an attached harrow, and including pivotable guide means attached to the forward end of the support frame for receiving the opposite end portions of said support bar, said guide means comprising a pair of guide plates, one on each side of the forward end of said support frame, and a vertically extending, substantially rectangular guide slot in each plate through which the ends of the support bar pass, said support bar having a quadrangular cross-section.

* * * * *